United States Patent
Park et al.

(10) Patent No.: US 8,554,188 B2
(45) Date of Patent: Oct. 8, 2013

(54) METHOD, APPARATUS AND SYSTEM FOR PROCESSING COMMUNICATION CALL

(75) Inventors: Jae-Min Park, Seoul (KR); Myoung-Hee Seo, Seoul (KR); Yong-Ki Min, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 13/336,855

(22) Filed: Dec. 23, 2011

(65) Prior Publication Data

US 2012/0202472 A1  Aug. 9, 2012

(30) Foreign Application Priority Data

Feb. 8, 2011  (KR) ........................ 10-2011-0011233

(51) Int. Cl.
*H04W 4/00* (2009.01)
*G09G 5/00* (2006.01)

(52) U.S. Cl.
USPC .......................................... 455/415; 340/10.4

(58) Field of Classification Search
USPC ................ 455/414.1–418, 550.1, 556.1–557, 455/564–567
See application file for complete search history.

(56) References Cited

U.S. PATENT DOCUMENTS

| 5,299,261 | A | * | 3/1994 | Bogart et al. | ................. | 379/354 |
| 2001/0013830 | A1 | * | 8/2001 | Garber et al. | ............... | 340/572.4 |
| 2006/0262924 | A1 | * | 11/2006 | Weiss et al. | ............... | 379/413.01 |
| 2008/0120128 | A1 | * | 5/2008 | Berglund et al. | ................. | 705/1 |
| 2011/0291815 | A1 | * | 12/2011 | Bemmel | ....................... | 340/10.6 |
| 2012/0288080 | A1 | * | 11/2012 | Martin | ..................... | 379/265.02 |
| 2012/0310743 | A1 | * | 12/2012 | Johri | .......................... | 705/14.58 |

FOREIGN PATENT DOCUMENTS

EP  1587014 A1 * 10/2005

* cited by examiner

*Primary Examiner* — Kashif Siddiqui
(74) *Attorney, Agent, or Firm* — Sughrue Mion, PLLC

(57) ABSTRACT

A method, communication terminal and system for processing a communication call are provided, the communication terminal including a reader configured to obtain tag information by reading a tag attached to an object the tag information comprising a terminating number; a communication unit configured to transmit a request for an originating call based on the terminating number; and a control unit configured to control the communication terminal to display termination display information corresponding to one of the obtained tag information and the transmitting of the request for originating the call, wherein the termination display information excludes the terminating number.

10 Claims, 7 Drawing Sheets

METHOD, APPARATUS AND SYSTEM FOR PROCESSING COMMUNICATION CALL

CROSS-REFERENCE TO RELATED APPLICATIONS

This application claims priority from Korean Patent Application No. 10-2011-0011233, filed with the Korean Intellectual Property Office on Feb. 8, 2011, the disclosure of which is incorporated herein by reference in its entirety.

BACKGROUND

1. Technical Field

Exemplary embodiments relate to a mobile communication system, and more specifically to a method and a system for processing a communication call by protecting the privacy of a user.

2. Background Art

In the related art communication systems, a call may be made by a user by directly inputting a recipient's telephone number, or by selecting a telephone number stored in an apparatus, such as a communication terminal. In this related art method, the telephone number is input or selected by a caller while the personal information (i.e., the telephone number) of the recipient is exposed, inadvertently exposing the personal information to unauthorized persons, regardless of the intent of the recipient.

Moreover, this kind of unprotected personal information (e.g., a telephone number) has been often used for illicit activities, such as voice phishing. As a result, there has been an increased need for the protection of such personal information.

SUMMARY

One or more exemplary embodiments may overcome the above disadvantages and other disadvantages not described above. However, one or more exemplary embodiments are not required to overcome the disadvantages described above, and may not overcome any of the problems described above.

An aspect of an exemplary embodiment provides a communication terminal including: a reader configured to obtain tag information by reading a tag attached to an object the tag information including a terminating number; a communication unit configured to transmit a request for an originating call based on the terminating number; and a control unit configured to control the communication terminal to display termination display information corresponding to one of the obtained tag information and the transmitting of the request for originating the call, wherein the displayed termination display information excludes the terminating number.

The communication terminal may further include a display unit configured to display the termination display information excluding the terminating number is performed under control of the control unit.

The communication terminal may further include a storage unit which is controlled by the control unit and configured to store an originating record corresponding to the originating call, wherein the originating record includes the termination display information excluding the terminating number.

The object may be a motor vehicle.

An aspect of an exemplary embodiment provides a method of processing a communication call by a communication terminal, the method including: reading a tag attached to an object, wherein the tag comprises tag information including a terminating number; transmitting a request for an originating call based on the terminating number included in the read tag; and controlling the communication terminal to display termination display information corresponding to one of the tag information and the transmitting of the request for originating the call, wherein the displayed termination display information excludes the terminating number.

The method may further include storing an originating record corresponding to the originating call, wherein the originating record includes the termination display information excluding the terminating number.

The method of claim 5, wherein, the termination display information may be obtained from the reading of the tag, and the termination display information may include a message to be displayed on the communication terminal wherein the message excludes the terminating number, and wherein the method may further include, prior to transmitting the request for the originating call, displaying the termination display information in the form of visual or audio information on the communication terminal.

An aspect of an exemplary embodiment provides a mobile communication system including: a caller display server configured to store caller identification (ID) text and use ID information, wherein the use ID information includes use ID information of an originating terminal and a terminating number; a first switch, which is located on an originating side and configured to obtain the caller ID text and the use ID information from the caller display server in response to a request for an originating call including the use ID information of the originating terminal and the terminating number; and a second switch, which is located on a terminating side and configured to receive a request for a communication call including the caller ID text from the first switch, and to attempt a terminating call to a terminating terminal.

The terminating terminal may output the caller ID text on the terminating terminal in response to the terminating call attempt of the second switch.

The originating terminal does not display the terminating number on the originating terminal when the request for the originating call is made.

An aspect of an exemplary embodiment provides a communication terminal including: a storage unit configured to store information display text corresponding to use identification information; a communication unit configured to receive a terminating call including the use identification information and an originating number; and a control unit configured to extract the information display text corresponding to the use identification information and control to output the information display text and the originating number as caller information in visual or audible form.

The communication may further include: an input unit configured to receive input corresponding to at least one of a terminating number, termination display information and the use identification information to be written in a tag as tag information; and a near field communication module configured to write the tag information in the tag.

An aspect of an exemplary embodiment provides a method of controlling a communication terminal, the method including: reading a tag information from a tag attached to an object, wherein the tag information includes a telephone number; determining whether the tag information includes termination display information; if the tag information includes the termination display information, displaying the tag information including the termination display information and excluding the telephone number; and originating a call based on the telephone number.

The method may further include, if the tag information does not include the termination display information, displaying default termination display information which excludes the telephone number.

DETAILED DESCRIPTION

Since there can be a variety of permutations and embodiments of the present inventive concept, certain exemplary embodiments will be illustrated and described with reference to the accompanying drawings so as to facilitate understanding, and thus, the exemplary embodiments described herein should not be construed as limiting. The matters defined in the description, such as detailed construction and elements, are provided to assist in a comprehensive understanding of the exemplary embodiments. Exemplary embodiments may be carried out without some specifically defined matters. Also, functions or elements known in the related art are not described in detail as they would obscure the exemplary embodiments with unnecessary detail.

Terms such as "first" and "second" can be used in describing various elements, but the above elements shall not be restricted to the above terms. The above terms are used only to distinguish one element from the other.

The terms used in the description are intended to describe certain exemplary embodiments only, and shall by no means restricting. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, certain exemplary embodiments will be described with reference to the accompanying drawings.

Figure 1:
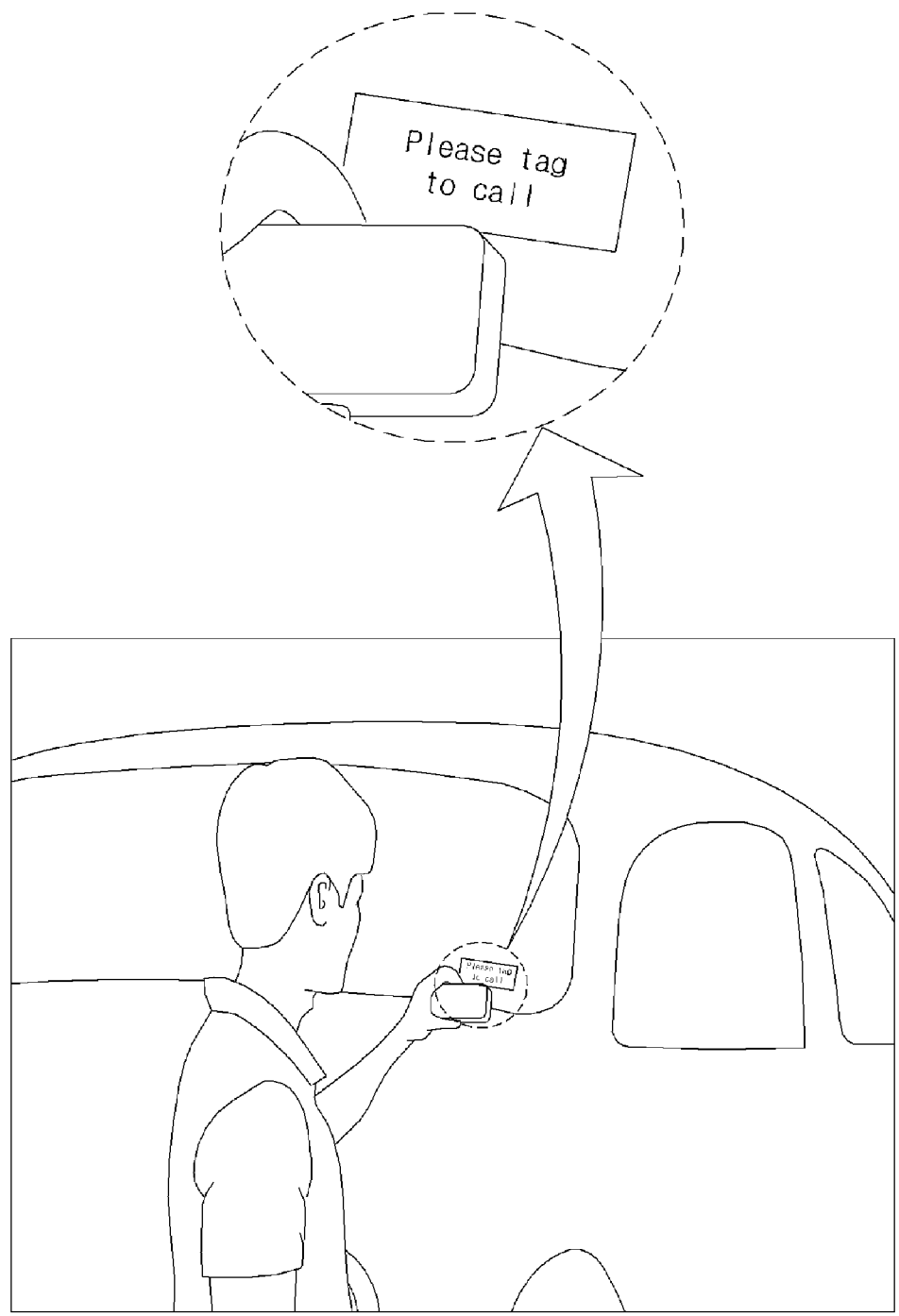
FIG. 1 illustrates how tag information is written in a tag using a communication terminal.

FIG. 1 illustrates how tag information is written in a tag using a communication terminal.

Used for the convenience of description and understanding in FIG. 1 is a method of attaching a tag to a parked motor vehicle and writing tag information, which includes a telephone number, in the tag. The tag can be attached to a courtesy parking display (e.g., displayed on a windshield of the parked motor vehicle to allow others to contact the driver of the parked motor vehicle) to be attached to and detached from the motor vehicle. Although it is illustrated in FIG. 1 that the tag is attached to the motor vehicle in the form of a courtesy parking display, it is also possible that the tag is attached to an object such as a delivery package. In such a case as well, a call can be made by equally protecting the privacy of a person by the method described below. This will be understood more clearly through the below description.

A user launches an application for writing the tag in an apparatus, such as the communication terminal, sets use identification information, for identifying the use of the tag, as well as a terminating number and termination display information through the application, and writes said information as tag information.

Here, when a call is made by a second user by reading the tag through the application launched in the communication terminal, the first user can set a message (referred to as "termination display information" hereinafter) to be displayed as information of a recipient instead of having the terminating number displayed in a communication terminal of the second user and write the message in the tag by including the tag information.

For example, the termination display information can be information such as "dialing the driver," which informs the other user that the recipient is being dialed, instead of the terminating number. The termination display information can in the form of letters or an image.

Hereinafter, a method of processing a communication call by another user by reading the tag information written in the tag will be described in detail.

Figure 2:
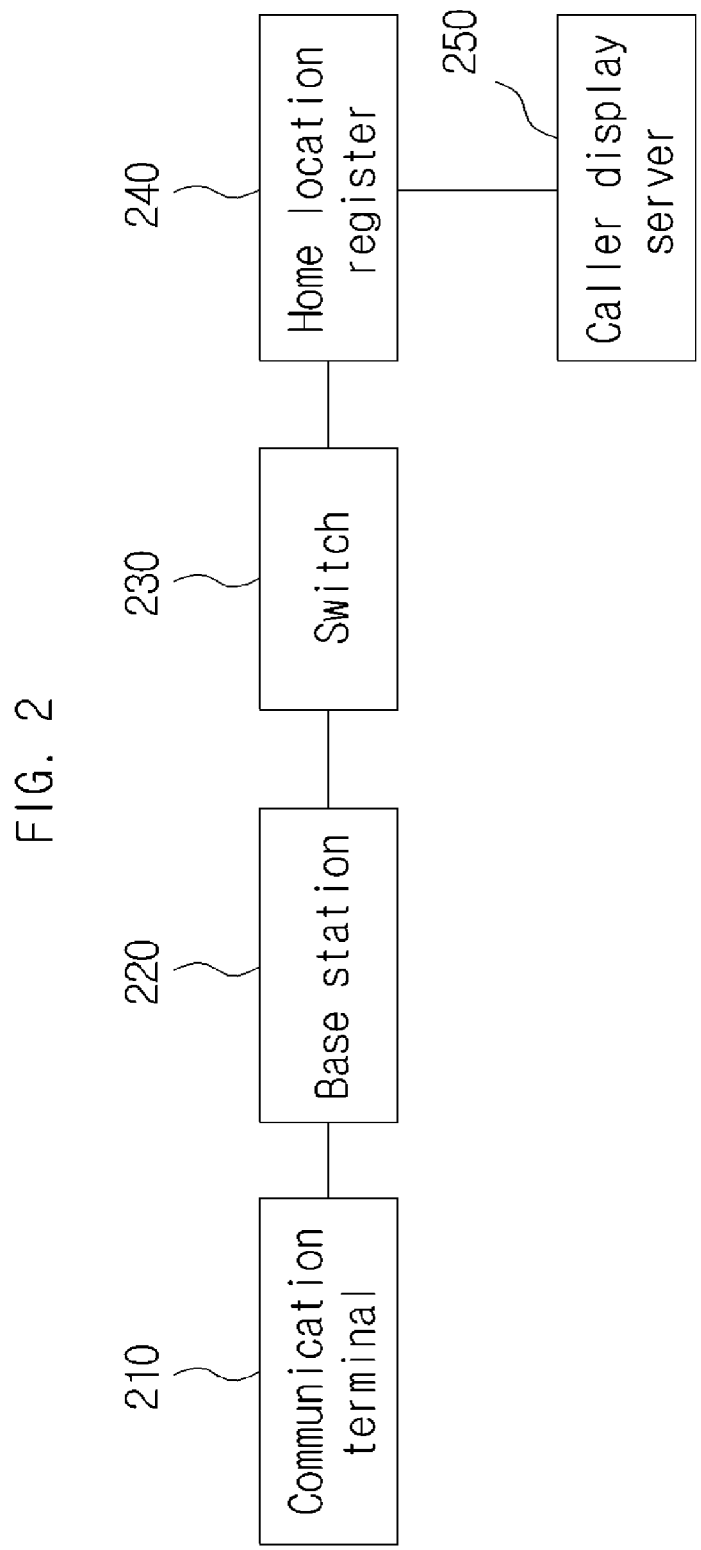
FIG. 2 is a block diagram briefly illustrating the configuration of a mobile communication system that can enable a communication by protecting the privacy of a user.

FIG. 2 is a block diagram briefly illustrating the configuration of a mobile communication system that can enable communication by protecting the privacy of a user.

Referring to FIG. 2, the mobile communication system can be configured so as to include a communication terminal 210, a base station 220, a switch 230, a home location register 240 and a caller display server 250.

The communication terminal 210 is a device for being provided with various mobile communication services through a communication network. For example, the communication terminal 210 can be a mobile communication terminal, a PDA, a smartphone, etc.

For the convenience of description and understanding, the communication terminal requesting a call will be referred to as an "originating terminal" and the communication terminal receiving a call will be referred to as a "terminating terminal."

In the present description, the originating terminal is mounted with a near field communication (NFC) module, and the terminating terminal can process a communication call received from the originating terminal. It shall be appreciated that the terminating terminal can also be mounted with an NFC module.

The originating terminal obtains at least one of the use identification information, terminating number and termination display information by reading the tag attached to an object or a motor vehicle by using a reader, and requests an originating call to be made to the terminating terminal by using the obtained information. Here, the originating terminal does not display the terminating number in the form of audiovisual information on the pertinent originating terminal and does not write an originating record pursuant to making the originating call. This will be described later in more detail.

The terminating terminal displays the use of the tag and an originating number of the originating terminal as caller information in accordance with the originating call that includes the use identification information of the originating terminal. This will be described later in more detail by referring to the relevant drawing.

The base station 220 receives location information, registrant information and a communication call of the communication terminal 210. For example, the base station 220 can be configured by including a base-station transmission system (BTS, not shown), a base station controller (BSC, not shown) and a repeater (not shown).

The BTS is arranged in units of cells and transmits the communication call of the communication terminal 210 to the switch 230 via the BSC. Moreover, the BTS assesses and registers the location of the communication terminal 210 that is present in cell areas controlled by the BTS.

The BTS receives location information of the BTS from the global positioning system (GPS, not shown). The BTS transfers the location information to the communication terminal 210 by using a system parameter message of a forward link call channel. The communication terminal 210 can register new location information by computing the location of the communication terminal 210 by using location information of the BTS of a cell to which the pertinent communication terminal 210 belongs. Registration of a location, which is a process of informing the location, status, identifier, slot frequency and other features of the communication terminal 210 to the switch 230 through the BTS, allows the communication terminal 210 to be effectively called when the BTS tries to configure a terminating call to the communication terminal 210. Said registration of a location is carried out when the communication terminal 210 is turned on or off, moves between the switches or changes its parameter.

The BSC controls and manages a plurality of base stations and performs various functions required for processing a wireless call, such as a hand-off. Moreover, the BSC transmits subscriber information of the terminal, whose location is registered, to the switch.

The BSC performs the function of transferring the communication call sent through the BTS from the communication terminal 210 to the switch 230.

The switch 230 has a control function for efficient operation of wireless base stations and a link function between the switches of the public switched telephone network and other networks. For example, once an originating call is received, the switch 230 checks the home location register 240 of a pertinent global title (GT) through translating a terminating prefix number. The switch 230 references the location information of the terminating terminal at the home location register 240 and then routes to another switch, in which the terminating terminal is located, according to the result of the reference.

Moreover, the switch 230 recognizes a special code included in termination information that is included in an originating call requested through the originating terminal, and transmits a routing request, which includes the termination information in which the special code is included, to the home location register 240. Then, the switch 230 receives a routing response, which includes intelligent logic trigger information, through the home location register 240. Here, the intelligent logic trigger information is information for triggering a communication call to an intelligent network. The intelligent logic trigger information can be inserted in the routing response by being included in a transaction code status indicator (TCSI) parameter, which is defined in the 3rd Generation Partnership Project (3GPP) standard, and then can be transmitted to the switch 230. Accordingly, if an intelligent network call is detected in the routing response from the home location register 240 (i.e., if the intelligent network logic trigger information is included in the routing response), the switch 230 transmits an initial detection point (IDP) message to an intelligent network service controller. Here, the IDP message includes the termination information.

The home location register 240 (also referred to as "HLR") is a database that stores a service profile for subscriber information of the user of the communication terminal 210. That is, the HLR 240 can store information on a terminal, subscription, location, etc. of a mobile communication subscriber and perform a subscriber authentication function requested through the switch 230.

Moreover, the HLR 240 controls a signaling network protocol (SS7) together with the switch 230 and a VLR node and performs a transaction for renewing the subscriber information for completing an incoming call. In addition, the HLR 240 stores all of the subscriber information including the information on the base station 220, in which the communication terminal 210 is located, and the switch 230.

The caller display server 250 is a device that provides a caller identification (ID) service. Specifically, the caller display server 250 can map and store a caller ID text for each of use identification information and extract and provide to the switch 230 the caller ID text mapped in the pertinent use identification information when a request to provide the caller ID service including the use identification information is received through the switch 230.

Moreover, the caller display server 250 can be linked to a web server (not shown) to map and store the use identification information and the caller ID text corresponding to a telephone number of the communication terminal 210 when the use identification information and the caller ID text are received through the communication terminal 210. Accordingly, when a request for providing the caller ID service including the terminating number and the use identification information is received later through the switch 230, the caller ID text mapped in the use identification information corresponding to the pertinent terminating number can be extracted and provided to the pertinent switch 230.

Figure 3:
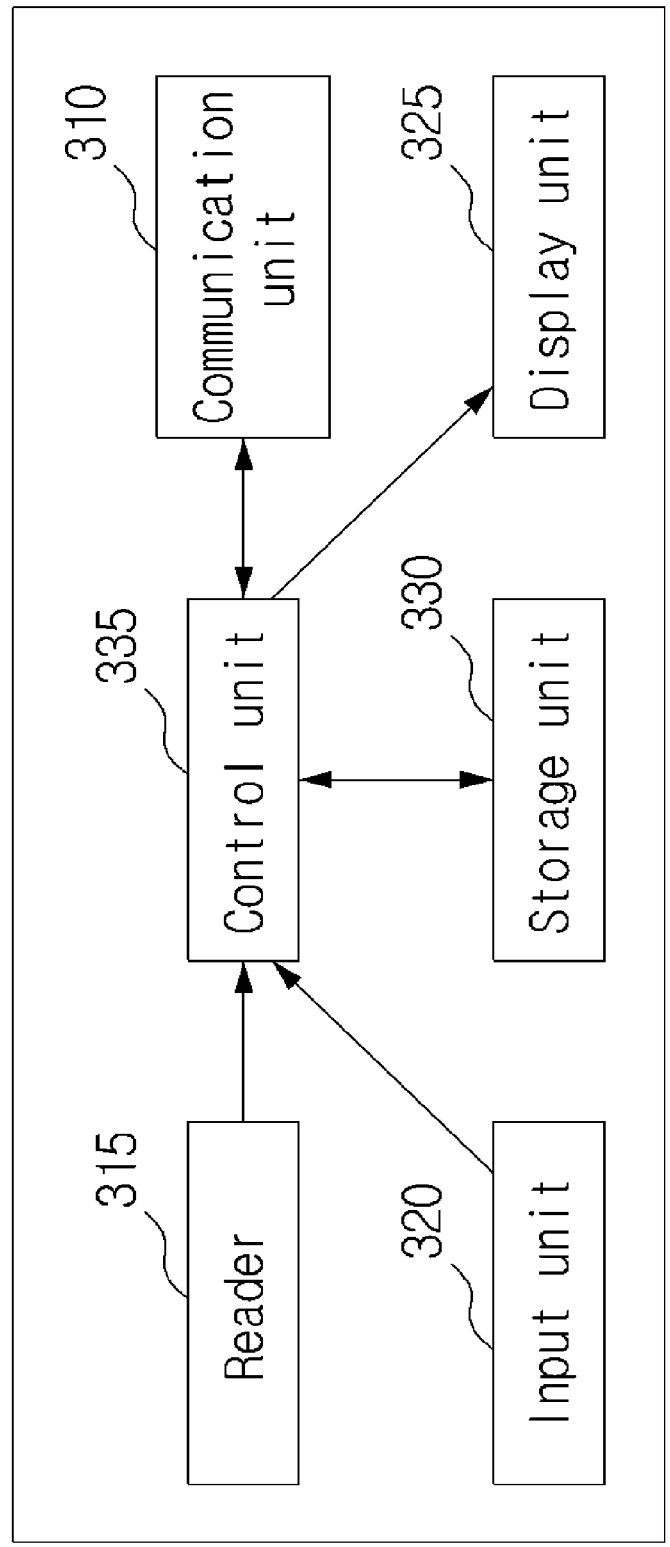
FIG. 3 is a block diagram briefly illustrating the internal configuration of an originating terminal.

FIG. 3 is a block diagram briefly illustrating the internal configuration of an originating terminal.

Referring to FIG. 3, the originating terminal is configured by including a communication unit 310, a reader 315, an input unit 320, a display unit 325, a storage unit 330 and a control unit 335. The term "unit" as used herein means a hardware component, such as a processor or circuit, and/or a software component that is executed by a hardware component such as a processor.

The communication unit 310 transmits and receives data to and from other devices (e.g., the terminating terminal) through a communication network.

For instance, the communication unit 310 can request an originating call, which includes the use identification information, the terminating number and the originating number, to the mobile communication system pursuant to the control of the control unit 335.

The reader 315 obtains the tag information by reading the tag attached to the object or the motor vehicle pursuant to the control of the control unit 335 and outputs the tag information to the control unit 335. Here, the tag information can include at least one of the use identification information, the terminating number and the termination display information. The use identification information, as described earlier, is information for identifying the use of the tag and can be configured by the user who attached the tag to the object or the motor vehicle.

The input unit 320 is inputted with a control command for controlling the operation of the terminating terminal, a control command for operating the application and any arbitrary information. For example, the input unit 320 can be realized with a plurality of key buttons (e.g., alphanumeric keys and * and # keys) and one or more function keys (e.g., menu key(s), a CALL key, an OK key, a RUN key, etc.) or can be realized in the form of a touch screen.

The display unit 325 outputs the information inputted through the input unit 320 by the control of the control unit 335 and the termination display information obtained through the reader 315 as visual information. The display unit 325 can be a liquid crystal display (LCD).

In an example, the display unit 325 can display the termination display information (e.g., text such as "dialing the driver" or "dialing the recipient") obtained through the reader 315 by the control of the control unit 335 in accordance with the originating call.

The storage unit 330 stores the application for operating the originating terminal and the termination display information.

The control unit 335 controls the internal components (e.g., the communication unit 310, the reader 315, the input unit 320, the display unit 325 and the storage unit 330) of the originating terminal.

Moreover, the control unit 335 can control an originating call to be made by using at least one of the use identification information, the terminating number and the termination display information that are obtained through the reader 315.

Here, the control unit 335 can perform a control in such a way that the terminating number is not displayed in the form of audio-visual information on the originating terminal in response to the originating call. In case the termination display information is included in the tag information obtained through the reader 315, the control unit 335 can control the display unit to display the termination display information excluding the terminating number.

Moreover, the control unit 335 can perform a control in such a way that the originating record is written in an internal memory of the originating terminal pursuant to the originating call. Specifically, once the communication call corresponding to the request for the originating call of the originating terminal is completed, the control unit 335 can control to have the use identification information, the terminating number and the termination display information that are obtained through the reader 315 deleted from the internal memory so that the originating record is not written.

Figure 4:
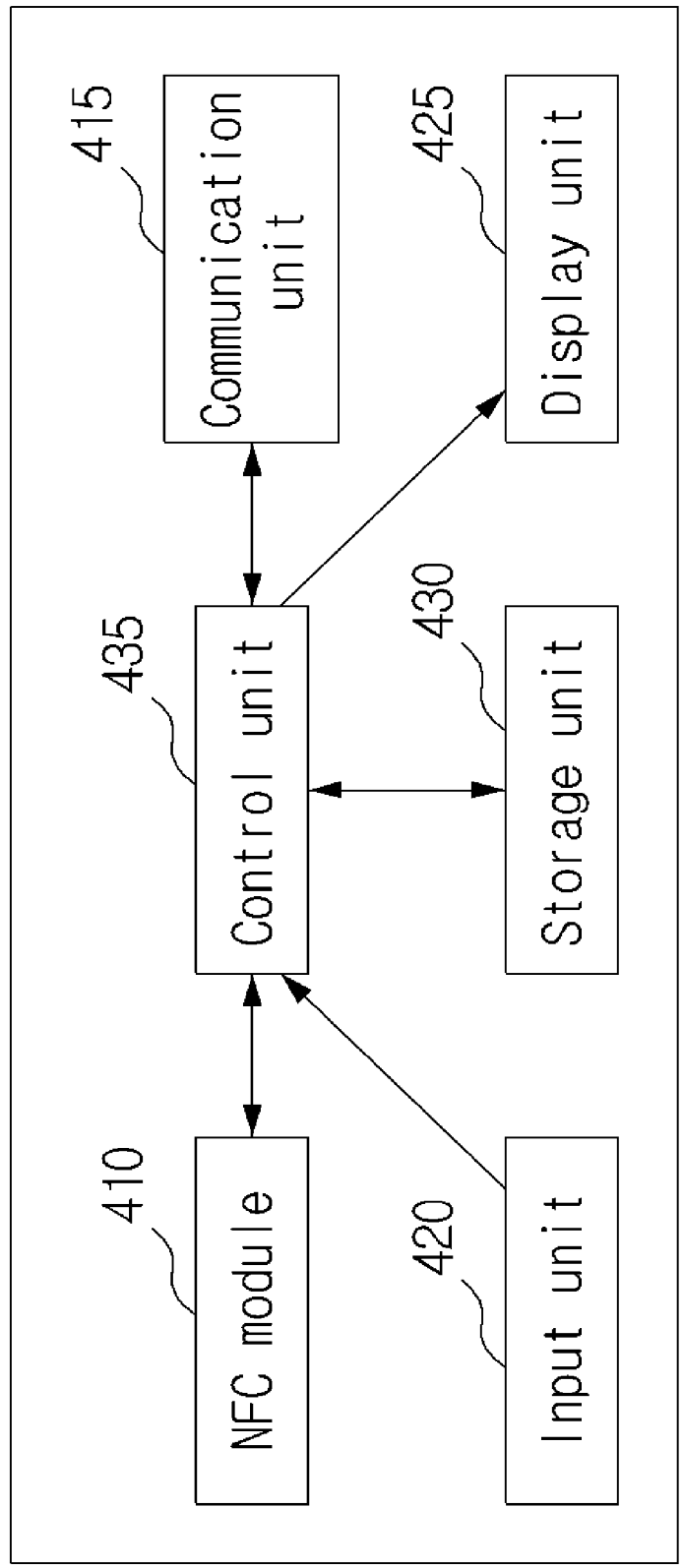
FIG. 4 is a block diagram briefly illustrating the internal configuration of a terminating terminal.

FIG. 4 is a block diagram briefly illustrating the internal configuration of a terminating terminal.

Referring to FIG. 4, the terminating terminal is configured by including an NFC module 410, a communication unit 415, an input unit 420, a display unit 425, a storage unit 430 and a control unit 435.

The NFC module 410 is a means for carrying out data communication using short-range wireless technologies that operate at 13.56 MHz. The NFC module 410 can be attached to a smart card included in the terminating terminal or can be attached to the terminating terminal. The NFC module 410 includes a tag mode and a reader mode. It is possible for the NFC module 410 to transmit and receive data to and from other devices that have an NFC module embedded therein, through near field communication in a P2P (peer to peer) method.

Hereinafter, it will be assumed that the NFC module 410 in FIG. 10 is operated in a tag mode. That is, the NFC module 410 can write the tag information in the tag according to the control of the control unit 435.

The communication unit 415 is a means for communicating the data with other devices (e.g., the originating terminal) through a communication network.

For example, the communication unit 415 can receive a terminating call including the use identification information and the originating number from the originating terminal through a mobile communication network and output the terminating call to the control unit 435.

The input unit 420 is a means for being inputted with a control command for controlling the operation of the terminating terminal, a control command for operating the application and any arbitrary information. For example, the input unit 420 can be realized with a plurality of key buttons (e.g., alphanumeric keys and * and # keys) and one or more function keys (e.g., menu key(s), a CALL key, an OK key, a RUN key, etc.) or can be realized in the form of a touch screen.

The display unit 425 is a means for outputting various data (e.g., data inputted through the input unit 420, data received through the communication unit 415) as visual information by the control of the control unit 435. The display unit 425 can be a liquid crystal display (LCD).

The storage unit 430 stores various applications for operating the terminating terminal. In addition, the storage unit 430 maps and stores an information display text for each of the use identification information.

The control unit 435 controls the internal components (e.g., the NFC module 410, the communication unit 415, the input unit 420, the display unit 425 and the storage unit 430) of the terminating terminal.

Moreover, once a terminating call including at least one of the use identification information and the originating number is received from the originating terminal through the communication unit 415, the control unit 435 can extract the information display text corresponding to the use identification information from the storage unit 430 and control at least one of the pertinent information display text and originating number to be outputted as recipient information through the terminating terminal. Although it is assumed, for the convenience of description and understanding, in FIG. 4 that the information display text corresponding to the use identification information is a text, it is also possible that an image form is used instead of the text form.

Furthermore, the caller information can be outputted in the form of visual information or audio information through the terminating terminal.

Figure 5:
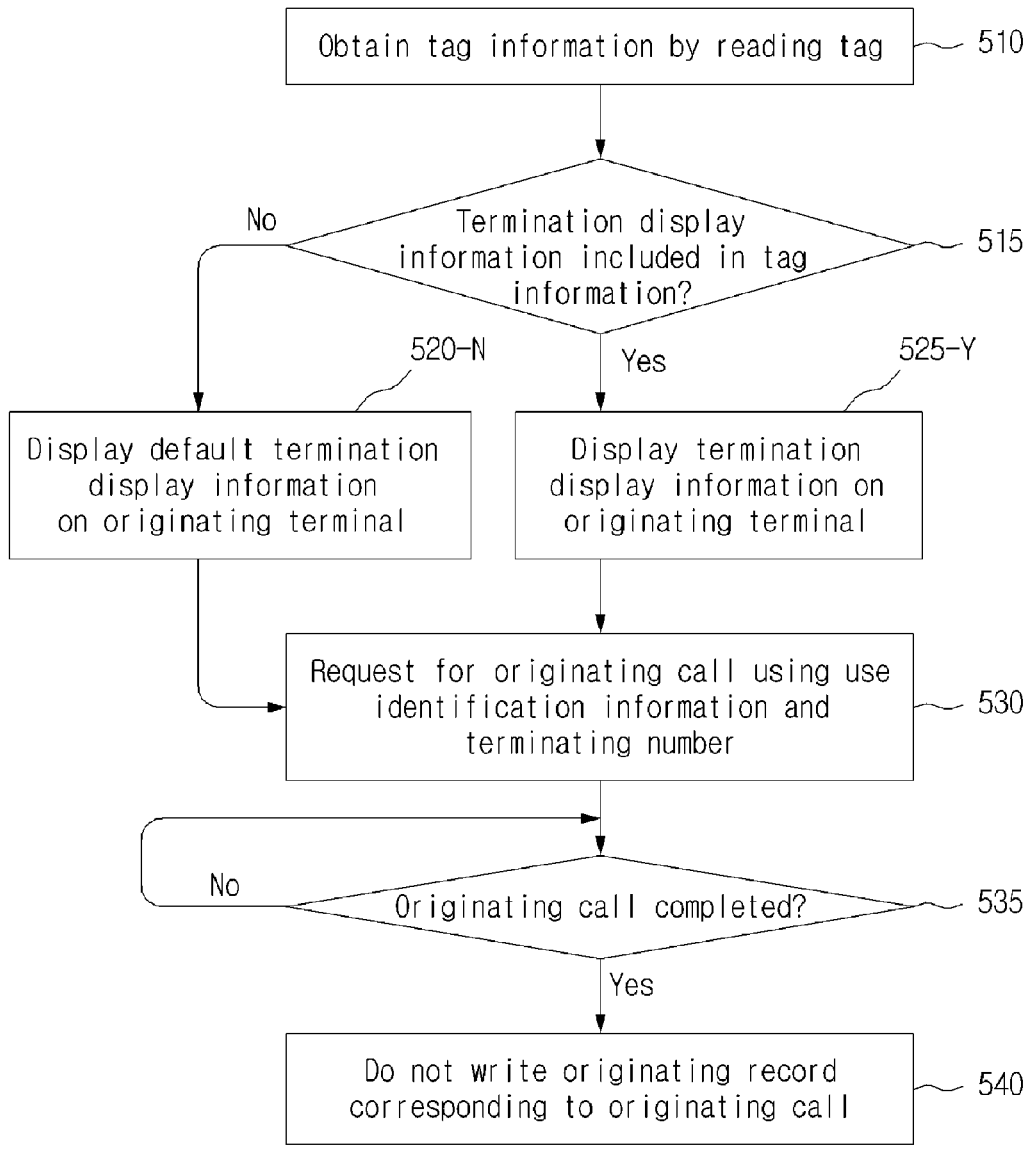
FIG. 5 is a flow diagram showing a method for processing a communication call by protecting the privacy of a user in an originating terminal.

FIG. 5 is a flow diagram showing a method for processing the communication call by protecting the privacy of the user in the originating terminal. Described hereinafter is a method of protecting the privacy of the user and requesting an originating call by having the originating terminal read the tag attached by the user. Moreover, although the steps described below are carried out by respective internal components of the originating terminal, these internal components will be collectively referred to as the originating terminal, for the convenience of description and understanding.

In step 510, the originating terminal reads the tag attached to the object or the motor vehicle and obtains the tag information. Here, the tag information can include at least one of the use identification information, the terminating number and the termination display information.

In step 515, the originating terminal determines whether the termination display information is included in the tag information.

If no termination display information is included in the tag information, the originating terminal displays default termination display information, instead of the terminating number, on the pertinent originating terminal, in step 520-N.

If, on the other hand, the termination display information is included, the originating terminal displays the termination display information, instead of the terminating number, on the originating terminal, in step 520-Y.

Then, in step 525, the originating terminal transmits a request for an originating call, which includes the use identification information and the terminating number, to the communication network.

Then, in step 530, the originating terminal determines whether the requested originating call is completed.

If the originating call is not complete, the process stands by in step 530.

If, however, the originating call is completed, the originating terminal does not write an originating record corresponding to the originating call in the pertinent originating terminal, in step 535.

As described above, when the originating terminal processes the communication call by reading the tag, the information (e.g., the telephone number) on the recipient is not displayed in the form of audio-visual information, and the record is not written, thereby protecting the private information of the recipient.

Hereinafter, a method of displaying the caller information on the terminating terminal in accordance with the request for the originating call of the originating terminal will be described in more detail with reference to FIG. 6.

Figure 6:
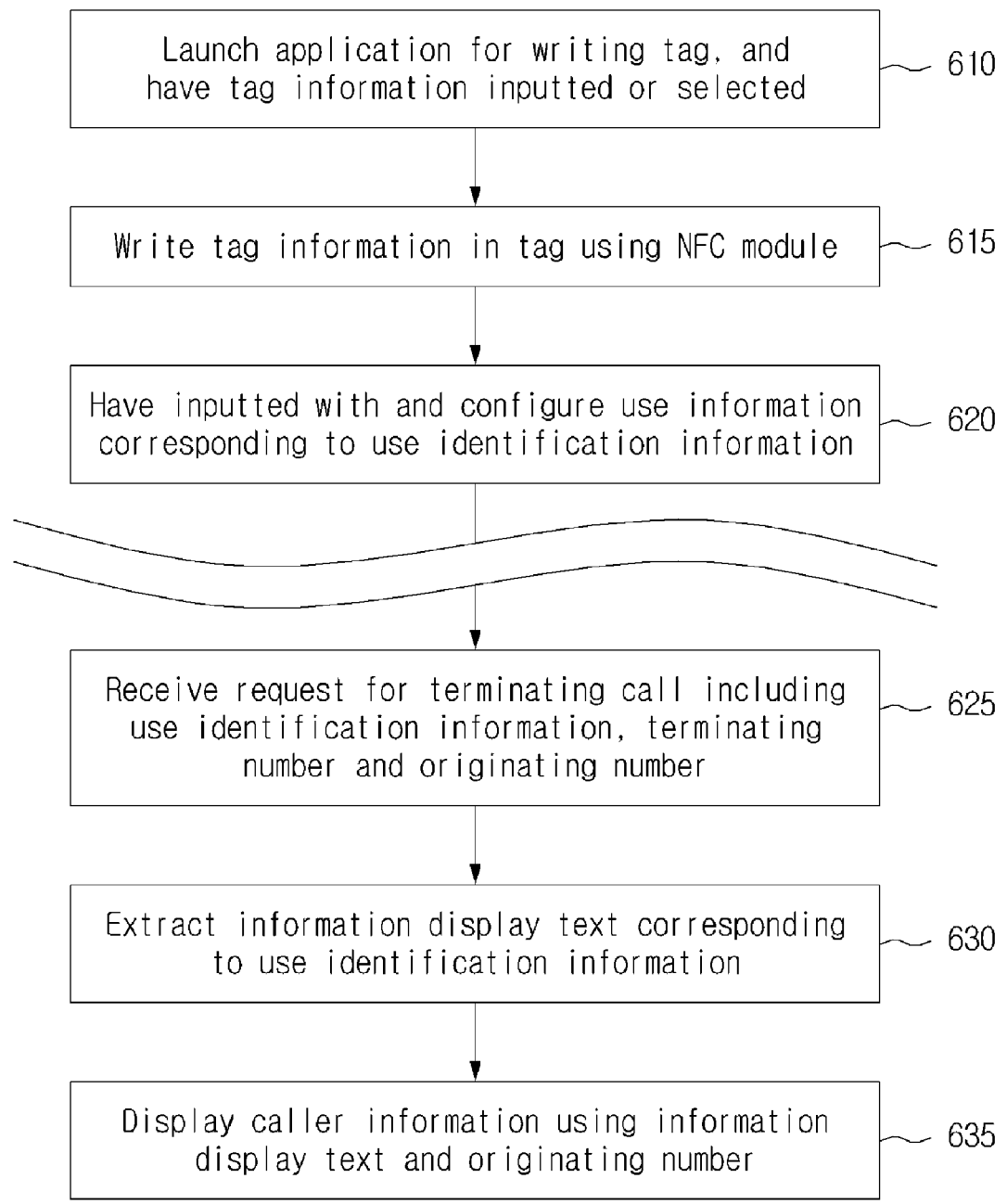
FIG. 6 is a flow diagram showing a method for displaying caller information in a terminating terminal in response to a request for an originating call.

FIG. 6 is a flow diagram showing a method for displaying the caller information in the terminating terminal in response to the request for the originating call. Although the steps described below are carried out by respective internal components of the terminating terminal, these internal components will be collectively referred to as the terminating terminal, for the convenience of description and understanding.

In step 610, the terminating terminal launches an application for writing the tag and is inputted or selected with the tag information to be written in the tag by the user. Here, the tag information can include at least one of the use identification information, which corresponds to the use of the tag, the terminating number and the termination display information to be displayed, instead of the terminating number, on the terminating terminal.

In step 615, the terminating terminal writes the tag information inputted or selected through the launched application in the tag through the installed NFC module.

In step 620, the terminating terminal configures an information display text corresponding to the use identification information. Here, the use identification information can be code information for identifying the use, and the information display text can be text information configured in accordance with the code information to facilitate the user's recognition. For example, the use identification information can be N bits of code information or number, N being a natural number. For example, the use identification can be "1111", and the information display text can be "parking."

Although it is assumed in steps 610 to 620 in FIG. 6 that the tag information is written in the tag on the terminating terminal, it is also possible that steps 610 to 620 in FIG. 6 are carried out in other devices than the terminating terminal.

In step 625, the terminating terminal receives a request for the terminating call including at least one of the use identification information, the terminating number and the originating number from the originating terminal.

In step 630, the terminating terminal extracts the information display text corresponding to the use identification information from an internal memory (e.g., the storage unit 430) in accordance with the received request for the terminating call.

Then, in step 635, the terminating terminal displays the information display text and the originating number in an audio-visual form as the caller information. It is of course possible that the terminating terminal outputs the information display text only as the caller information.

Accordingly, the recipient only recognizes the information display text included in the call information that is displayed on the terminating terminal to easily understand the purpose of the communication call.

While it has been described with reference to FIG. 6 that the information display text stored in the terminating terminal is used to display the caller information, a method of providing the caller information through a mobile communication system will be described below with reference to FIG. 7.

Figure 7:
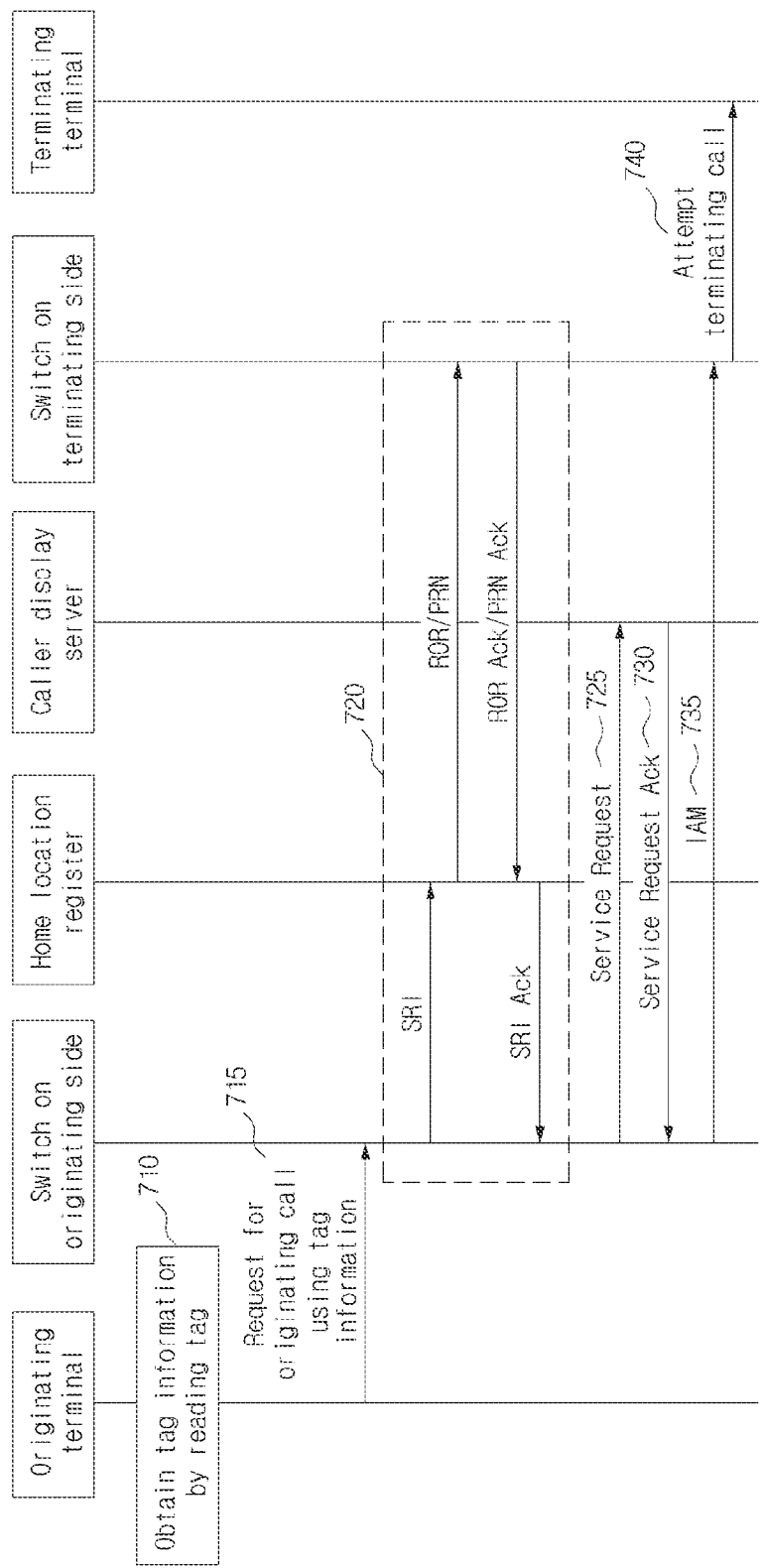
FIG. 7 is a flow diagram for illustrating a method for processing a communication call by protecting the privacy of a user in a mobile communication system.

FIG. 7 is a flow diagram for illustrating a method for protecting the privacy of a user and processing a communication call in a mobile communication system.

In step 710, the originating terminal reads the tag attached to the object or the motor vehicle and obtains at least one of the use identification information, the terminating number and the termination display information as the tag information.

Then, in step 715, the originating terminal transmits a request for the originating call including the obtained use identification information, terminating number and originating number to a switch on an originating side.

Accordingly, in step 720, the switch on the originating side uses the terminating number included in the request for the originating call to query the home location register and obtains the location information corresponding to the terminating terminal.

More specifically, the switch on the originating side transmits send routing information (SRI) including the terminating number to the home location register, and home location register transmits a routing request message (ROR (routing request) or PRN (providing roaming number)) to a switch on the terminating side in accordance with the SRI. Accordingly, the home location register receives a routing acknowledgment message (ROR Ack or PRN Ack) from a final switch on the terminating side that is connected with the terminating terminal. Then, the home location register transmits a send routing information acknowledgment message (SRI Ack) including the location information of the switch on the terminating side to the switch on the originating side.

In step 725, the switch on the originating side transmits a caller ID service request message (Service Request), which includes the use identification information, to the caller display server 250.

Accordingly, in step 730, the caller display server 250 transmits a caller ID service acknowledgment message (Service Request Ack), which includes a text (i.e., caller information) designated to correspond to the use identification information, to the switch on the originating side.

For this, the terminating terminal or the communication terminal of the user that is attached with the tag can register the caller information corresponding to the use identification information through the web server (not shown) and request for the caller ID.

In step 735, the switch on the originating side can extract the caller information included in the caller ID service acknowledgment message and transmit a communication call request (IAM), which includes the pertinent caller information, to the switch on the terminating side.

Accordingly, in step 740, the switch on the terminating side can attempt the terminating call, which includes the caller information, to the terminating terminal. Then, in response to the terminating call attempt of the switch on the terminating side, the terminating terminal can display the caller information included in the pertinent terminating call attempt on the terminating terminal.

The method for processing a communication call in accordance with an exemplary embodiment can be realized in the form of program instructions, which can be performed through various electronic data processing means, and can be written in a storage medium, which can include program instructions, data files, data structures and the combination thereof.

The program instructions stored in the storage medium can be designed and configured specifically for an exemplary embodiment or can be publically known and available to those who are skilled in the field of software. Examples of the storage medium can include magnetic media, such as a hard disk, a floppy disk and a magnetic tape, optical media, such as CD-ROM and DVD, magneto-optical media, such as a floptical disk, and hardware devices, such as ROM, RAM and flash memory, which are specifically configured to store and run program instructions. Moreover, the above-described media can be transmission media, such as optical or metal lines and a waveguide, which include a carrier wave that transmits a signal designating program instructions, data structures, etc. Examples of the program instructions can include machine codes made by, for example, a compiler, as well as high-language codes that can be executed by an electronic data processing device, for example, a computer, by using an interpreter.

The above hardware devices can be configured to operate as one or more software modules in order to perform the operation of an exemplary embodiment, and the opposite is also possible.

Although some exemplary embodiments have been described above, it shall be appreciated that there can be a variety of permutations and modifications that may be made without departing from the technical ideas and scope of the present inventive concept.

What is claimed is:

1. A communication terminal comprising:
a reader configured to obtain tag information by reading a tag attached to an object the tag information comprising a terminating number;
a communication unit configured to transmit a request for an originating call based on the terminating number; and
a control unit configured to control the communication terminal to display termination display information corresponding to one of the obtained tag information and the transmitting of the request for originating the call, wherein the displayed termination display information excludes the terminating number, and to control the communication terminal to not write a record related to the originating call in the communication terminal.

2. The communication terminal of claim 1, wherein the communication terminal further comprises a display unit configured to display the termination display information excluding the terminating number is performed under control of the control unit.

3. A communication terminal comprising:
a reader configured to obtain tag information by reading a tag attached to an object the tag information comprising a terminating number;
a communication unit configured to transmit a request for an originating call based on the terminating number; and
a control unit configured to control the communication terminal to display termination display information corresponding to one of the obtained tag information and the transmitting of there request for originating the call, wherein the displayed termination display information excludes the terminating number,
wherein the communication terminal further comprises a storage unit which is controlled by the control unit and configured to store an originating record corresponding to the originating call, wherein the originating record includes the termination display information excluding the terminating number.

4. A communication terminal comprising:
a reader configured to obtain tag information by reading a tag attached to an object the tag information comprising a terminating number;
a communication unit configured to transmit a request for an originating call based on the terminating number; and
a control unit configured to control the communication terminal to display termination display information corresponding to one of the obtained tag information and the transmitting of the request for originating the call, wherein the displayed termination display information excludes the terminating number,
wherein the object is a motor vehicle.

5. A method of processing a communication call by a communication terminal, the method comprising:
reading a tag attached to an object, wherein the tag comprises tag information including a terminating number;
transmitting a request for an originating call based on the terminating number included in the read tag; and
controlling the communication terminal to display termination display information corresponding to one of the tag information and the transmitting of the request for originating the call, wherein the displayed termination display information excludes the terminating number, and to not write a record related to the originating call in the communication terminal.

6. A method of processing a communication call by a communication terminal, the method comprising:
reading a tag attached to an object, wherein the tag comprises tag information including a terminating number;
transmitting a request for an originating call based on the terminating number included in the read tag;
controlling the communication terminal to display termination display information corresponding to one of the tag information and the transmitting of the request for originating the call, wherein the displayed termination display information excludes the terminating number, and
storing an originating record corresponding to the originating call, wherein the originating record includes the termination display information excluding the terminating number.

7. A method of processing a communication call by a communication terminal, the method comprising:
reading a tag attached to an object, wherein the tag comprises tag information including a terminating number;
transmitting a request for an originating call based on the terminating number included in the read tag;
controlling the communication terminal to display termination display information corresponding to one of the tag information and the transmitting of the request for originating the call, wherein the displayed termination display information excludes the terminating number,
wherein, the termination display information is obtained from the reading of the tag, and the termination display information comprises a message to be displayed on the communication terminal wherein the message excludes the terminating number, and
wherein the method further comprises, prior to transmitting the request for the originating call, displaying the termination display information in the form of visual or audio information on the communication terminal.

8. A method of processing a communication call by a communication terminal, the method comprising:

reading a tag attached to an object, wherein the tag comprises tag information including a terminating number;

transmitting a request for an originating call based on the terminating number included in the read tag;

controlling the communication terminal to display termination display information corresponding to one of the tag information and the transmitting of the request for originating the call, wherein the displayed termination display information excludes the terminating number, wherein the object is a motor vehicle.

9. A method of controlling a communication terminal, the method comprising:

reading a tag information from a tag attached to an object, wherein the tag information includes a telephone number;

determining whether the tag information includes termination display information;

if the tag information includes the termination display information, displaying the tag information including the termination display information and excluding the telephone number; and originating a call based on the telephone number, wherein a record related to the originating call is not stored in the communication terminal.

10. The method of claim 9, further comprising if the tag information does not include the termination display information, displaying default termination display information which excludes the telephone number.

* * * * *